US012769082B2

(12) United States Patent
Suzuki

(10) Patent No.: US 12,769,082 B2
(45) Date of Patent: Oct. 20, 2026

(54) LENS MODULE

(71) Applicant: CANON KABUSHIKI KAISHA, Tokyo (JP)

(72) Inventor: Kei Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 18/904,587

(22) Filed: Oct. 2, 2024

(65) Prior Publication Data

US 2025/0155665 A1 May 15, 2025

(30) Foreign Application Priority Data

Nov. 13, 2023 (JP) ................................ 2023-192689

(51) Int. Cl.
*G02B 7/02* (2021.01)

(52) U.S. Cl.
CPC ............ *G02B 7/023* (2013.01); *G02B 7/021* (2013.01)

(58) Field of Classification Search
CPC ........ G02B 7/023; G02B 7/021; G02B 7/022; G02B 7/026; G02B 7/04
USPC ......................................................... 359/822
See application file for complete search history.

(56) References Cited

U.S. PATENT DOCUMENTS

2021/0302805 A1* 9/2021 Yoshida ................ G03B 17/08
2023/0152576 A1* 5/2023 Nozaki ............. G02B 27/0006 348/374
2023/0314619 A1* 10/2023 Tsuzuki ............... G01S 17/931

FOREIGN PATENT DOCUMENTS

JP 2006276731 A 10/2006

* cited by examiner

*Primary Examiner* — Mohammed A Hasan
(74) *Attorney, Agent, or Firm* — Cowan, Liebowitz & Latman, P.C.

(57) ABSTRACT

A lens module includes a lens unit that includes a barrel member that holds a lens, and an operating member fixed to an outer circumference of the barrel member, a holding member that rotatably holds the lens unit, and a fixed member fixed to the operating member with a screw. The barrel member includes first convex portions configured to fix the lens at a plurality of locations in a circumferential direction. The operating member includes a second convex portion disposed between the first convex portions in the circumferential direction. A screw hole into which the screw is screwed is formed in a radial direction at a portion in the circumferential direction of the operating member, in which the second convex portion is provided.

8 Claims, 6 Drawing Sheets

LENS MODULE

BACKGROUND

Technical Field

The disclosure relates to a lens module for a wearable terminal, an in-vehicle (on-board) camera, a surveillance camera, and the like.

Description of Related Art

As disclosed in Japanese Patent Laid-Open No. 2006-276731, a compact image pickup apparatus described above includes an operation ring disposed on an outer circumference of a barrel member that is manually rotatable by the user to move a lens unit for focusing. In the image pickup apparatus disclosed in Japanese Patent Laid-Open No. 2006-276731, a screw is inserted through a long groove formed in the operation ring, the tip of the screw is screwed into a circumferential wall portion of the barrel member, and a rotatable range of the operation ring relative to the barrel member is restricted to a range corresponding to the length of the long groove.

In the structure disclosed in Japanese Patent Laid-Open No. 2006-276731, a screw hole into which the tip of the screw is screwed is formed in the circumferential wall portion of the barrel member, and in order to secure the depth of the screw hole, the radial thickness of the circumferential wall portion is to be increased. As a result, it becomes difficult to reduce the size of the image pickup apparatus.

SUMMARY

A lens module according to one aspect of the disclosure includes a lens unit that includes a barrel member that holds a lens, and an operating member fixed to an outer circumference of the barrel member, a holding member that rotatably holds the lens unit, and a fixed member fixed to the operating member with a screw. The barrel member includes first convex portions configured to fix the lens at a plurality of locations in a circumferential direction. The operating member includes a second convex portion disposed between the first convex portions in the circumferential direction. A screw hole into which the screw is screwed is formed in a radial direction at a portion in the circumferential direction of the operating member, in which the second convex portion is provided.

Further features of various embodiments of the disclosure will become apparent from the following description of embodiments with reference to the attached drawings.

DETAILED DESCRIPTION

Referring now to the accompanying drawings, a description will be given of embodiments according to the present disclosure.

Figure 1:
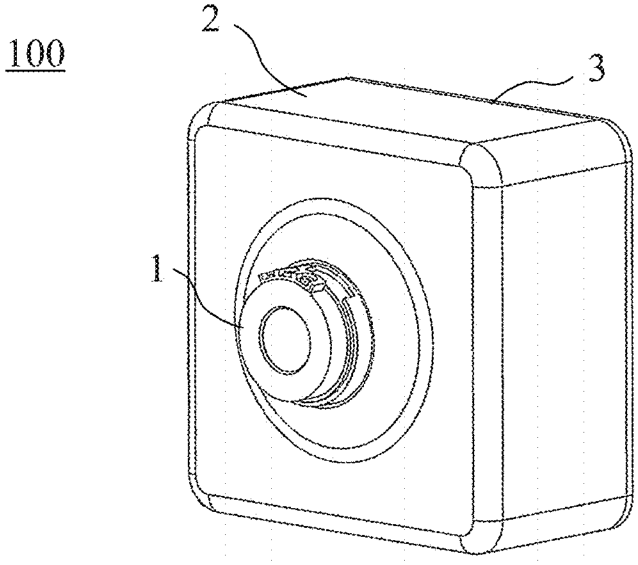
FIG. 1 is a perspective view of a camera according to this embodiment.

FIG. 1 illustrates the appearance of a camera unit 100 according to this embodiment. The camera unit 100 is used in wearable devices such as AR glasses, in-vehicle cameras, surveillance cameras, and the like.

The camera unit 100 includes a camera module 1 (a lens module) as an image pickup apparatus, an exterior case 2, and a rear cover 3. The camera module 1 is housed in the exterior case 2 so that a part of it (barrel) is exposed from an opening provided in the front surface of the exterior case 2, and is fixed and held in the exterior case 2 by unillustrated screws. A gap between the opening of the exterior case 2 and the camera module 1 is sealed by an unillustrated sealing member. This structure can prevent dust and water from entering the inside through the gap between the exterior case 2 and the camera module 1. The lens module according to this embodiment does not necessarily include an image sensor, unlike the image pickup apparatus that includes the image sensor.

The rear cover 3 is fixed to the rear end of the exterior case 2 housing the camera module 1 by unillustrated screws. An unillustrated sealing member is also disposed between the exterior case 2 and the rear cover 3, which prevents dust and water from entering the inside through the gap between the exterior case 2 and the rear cover 3. The rear cover 3 has an unillustrated external interface, and by connecting a cable to the external interface, a video signal generated by the camera module 1 through imaging can be output to the outside. Instead of the external interface, a transmitter configured to transmit the video signal to the outside via wireless communication may be provided.

Figure 2:
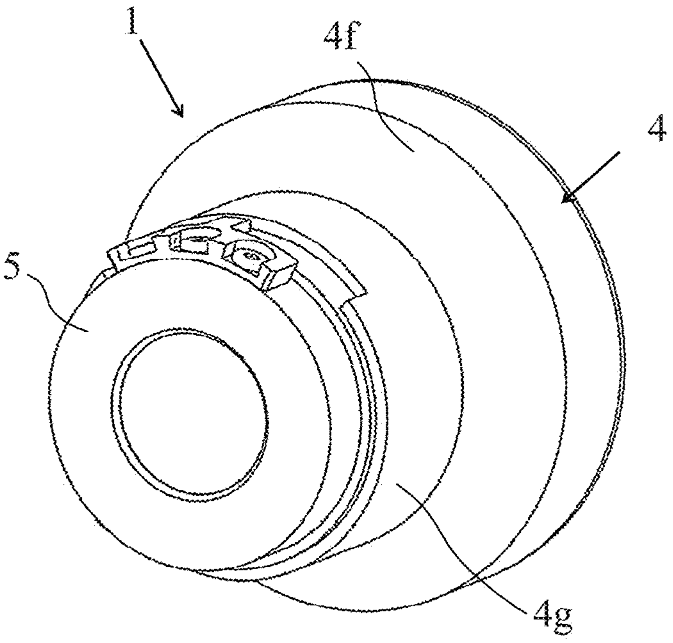
FIG. 2 is a perspective view of a camera module according to this embodiment.
Figure 3:
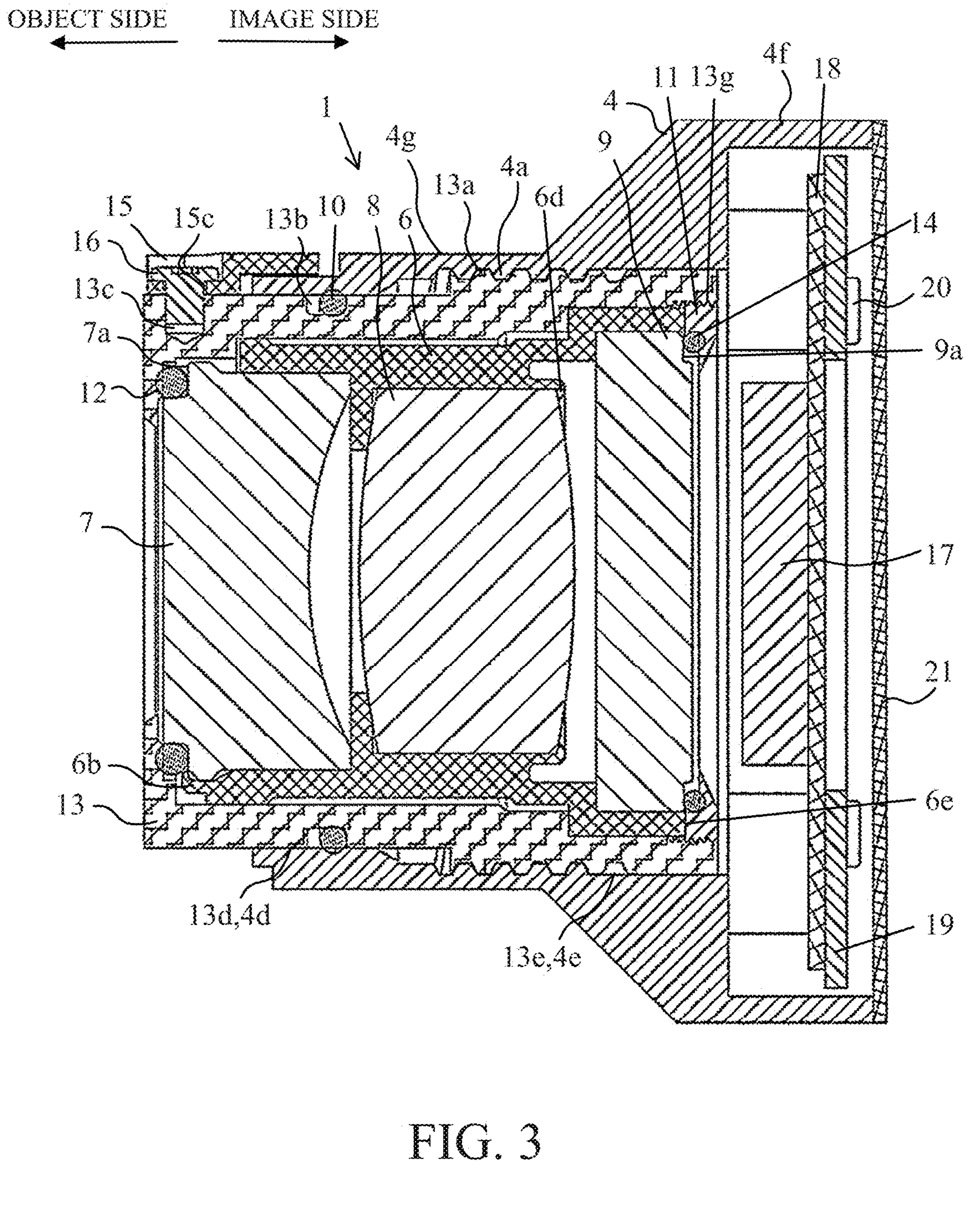
FIG. 3 is an exploded perspective view of the camera module according to this embodiment viewed from an object side.
Figure 4:
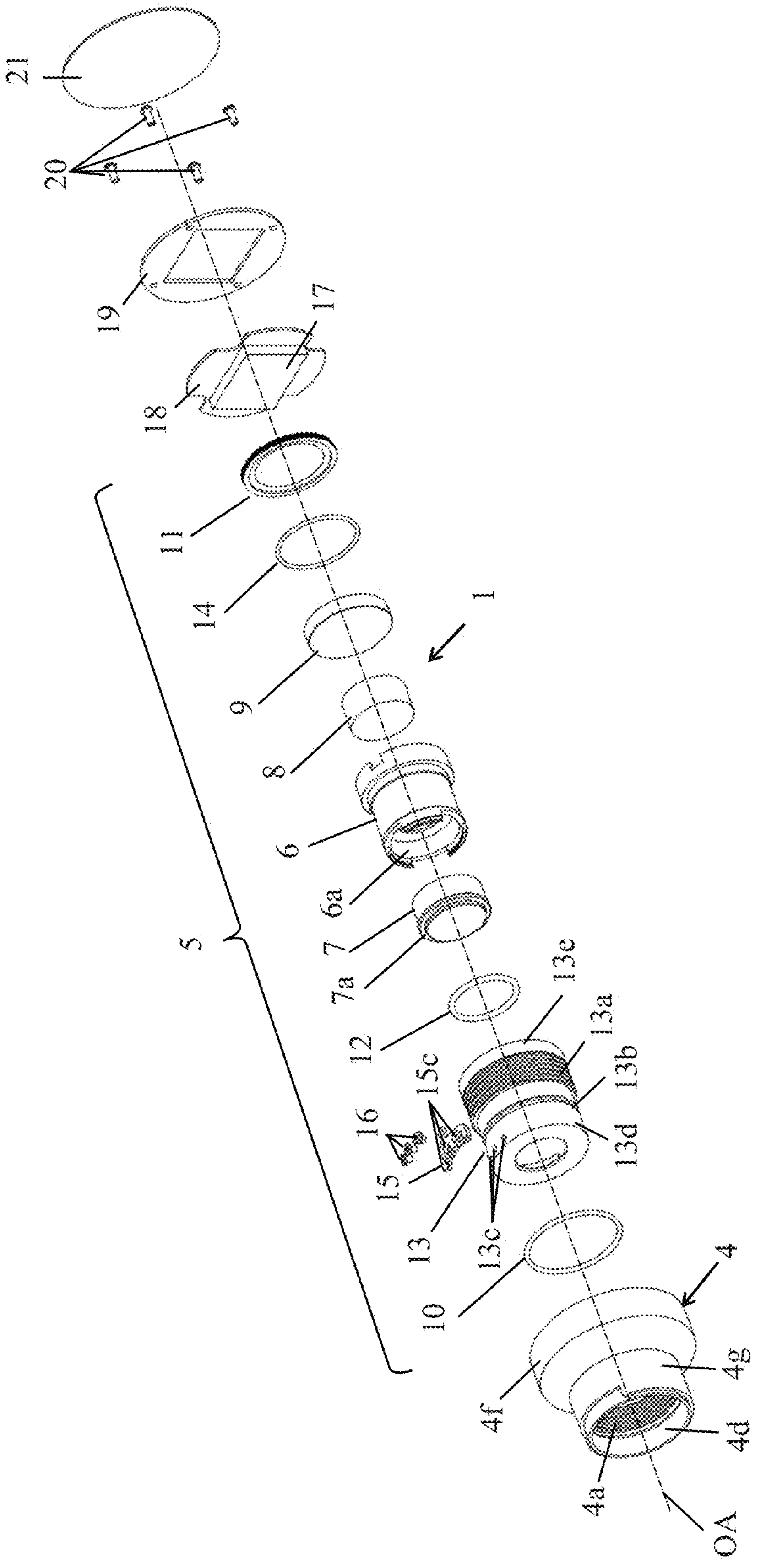
FIG. 4 is an exploded perspective view of the camera module according to this embodiment viewed from an image side.
Figure 5:
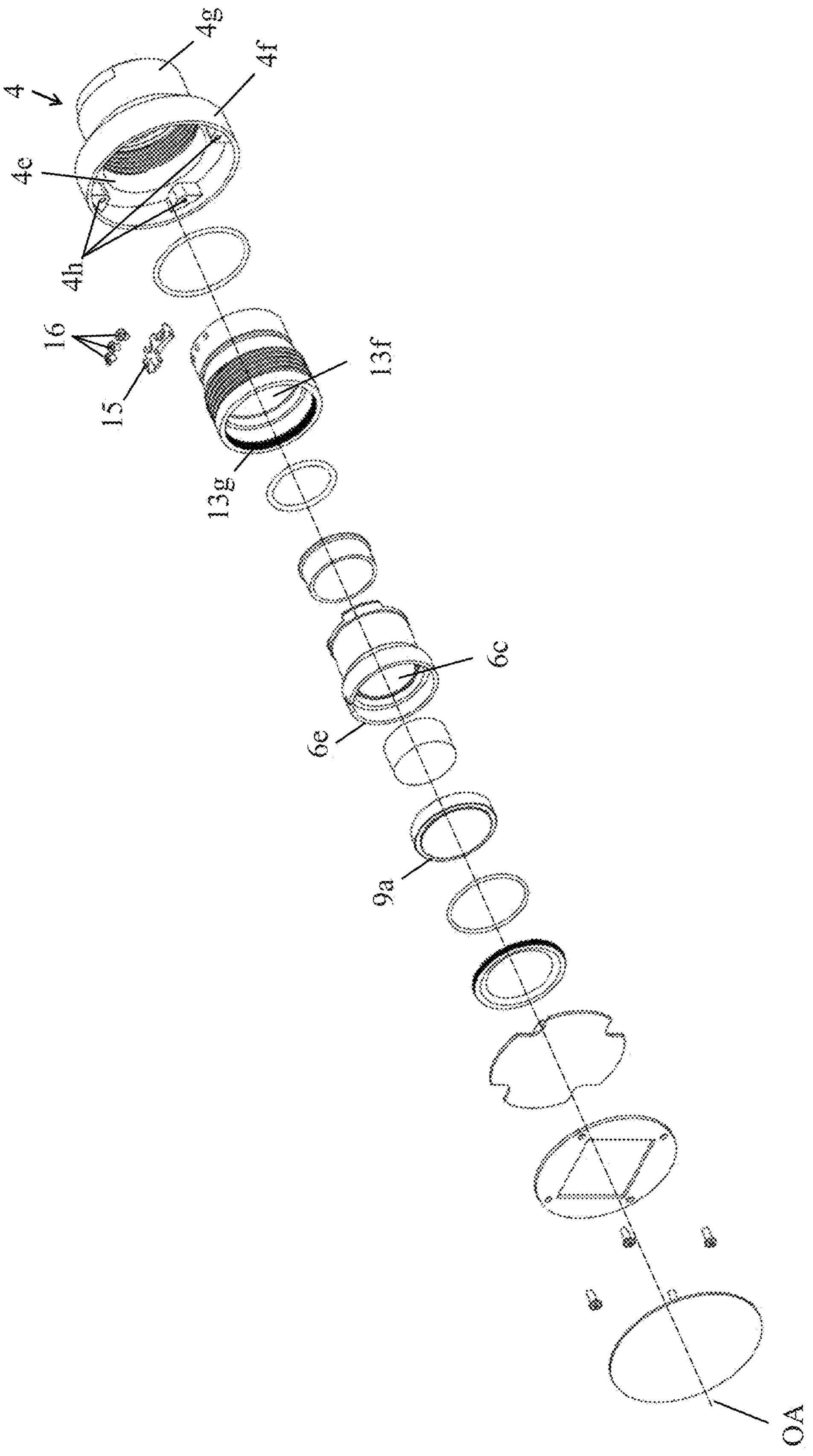
FIG. 5 is a sectional view of the camera module according to this embodiment.
Figure 6:
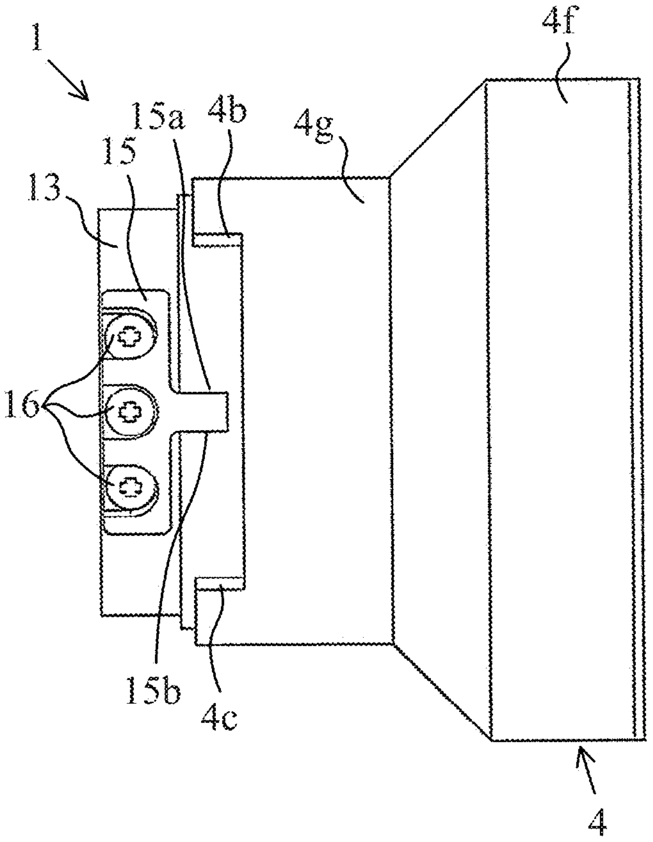
FIG. 6 is a top view of the camera module according to this embodiment.

FIG. 2 illustrates the camera module 1. FIG. 3 illustrates a section of the camera module 1 taken along a plane including the optical axis. A left side of FIG. 3 is an object side (front side), and a right side is an image side (rear side). FIGS. 4 and 5 are exploded views of the camera module 1 viewed from the diagonal front side and diagonal rear side, respectively. FIG. 6 illustrates the camera module 1 as viewed from above.

The camera module 1 includes a holding member 4 having a barrel holder 4*g* and a board holder 4*f*, a lens unit 5 housed in the barrel holder 4*g*, a circuit board 18 housed in the board holder 4*f*, and a cover 21 fixed to the rear end of the board holder 4*f*.

The lens unit 5 includes a barrel frame 6 as a barrel member, a first lens 7, a second lens 8, a third lens 9 held inside the barrel frame 6, an operation ring 13 as an operating member disposed on the outer circumference of the barrel frame 6, and a rotation restricting member 15 as a fixed member.

The operation ring 13 is disposed on the outer circumference of the barrel frame 6. The operation ring 13 is fixed to the barrel frame 6 with an adhesive. The outer circumference of the operation ring 13 is provided with an outer circumferential threaded portion 13*a* and a circumferential groove portion 13*b*. A first elastic body 10 as a first sealing member is an O-ring, and is fitted into the circumferential groove portion 13*b* and attached to the operation ring 13.

While the first elastic body 10 is attached to the operation ring 13, the lens unit 5 is inserted from the rear into the barrel holder 4*g* of the holding member 4. At this time, the lens unit 5 is rotated around an optical axis OA so that the outer circumferential threaded portion 13*a* of the operation ring 13 is engaged with (screwed with) an inner circumferential threaded portion 4*a* provided on the inner circumferential portion of the barrel holder 4*g*. Thereby, the lens unit 5 is held by the holding member 4.

The outer circumferential threaded portion 13*a* and the inner circumferential threaded portion 4*a* form a screw mechanism. The lens unit 5 held by the holding member 4 can be rotated relative to the holding member 4 with the outer circumferential threaded portion 13*a* and the inner circumferential threaded portion 4*a* screwed together. By rotating the lens unit 5 relative to the holding member 4, the lens unit 5 moves in a direction in which the optical axis OA extends (optical axis direction) relative to the holding member 4 according to the lead of the outer circumferential threaded portion 13*a* and the inner circumferential threaded portion 4*a*. The first elastic body 10 is sandwiched between the outer circumferential portion of the operation ring 13 and the inner circumferential portion of the barrel holder 4*g*, and thereby seals the gap between the outer circumferential portion of the operation ring 13 and the inner circumferential portion of the barrel holder 4*g*. This structure can prevent dust and water from entering through the gap.

The rotation restricting member 15 has three holes 15*c*, and three screws 16 are inserted into these holes 15*c* with their tips passing through the holes 15*c*. While the lens unit 5 is rotated and moved to a proper position in the optical axis direction relative to the holding member 4, the tips of the three screws 16 protruding from the rotation restricting member 15 are screwed into three screw holes 13*c* provided in the operation ring 13 from the outside of the operation ring 13 in the radial direction. Thereby, the rotation restricting member 15 is fixed to the operation ring 13.

As illustrated in FIG. 6, the rotation restricting member 15 includes a first stopper portion 15*a* and a second stopper portion 15*b*. A first stopper portion 4*b* and a second stopper portion 4*c* are provided on the outer circumference of the barrel holder 4*g* of the holding member 4, spaced apart from each other in the circumferential direction. In a case where the operation ring 13 (lens unit 5) is rotated in the circumferential direction around the optical axis relative to the holding member 4, the first and second stopper portions 15*a* and 15*b* of the rotation restricting member 15 come into contact with the first and second stopper portions 4*b* and 4*c* (both ends of the rotatable range) of the holding member 4, respectively, and thereby further rotation of the operation ring 13 is prevented. This structure can restrict a rotatable range of the operation ring 13 relative to the holding member 4, that is, a movable range of the lens unit 5 in the optical axis direction relative to the holding member 4.

A first engagement portion 4*d* and a second engagement portion 4*e* are provided at the front and rear portions of the inner circumference of the barrel holder 4*g* of the holding member 4. A first sliding portion 13*d* and a second sliding portion 13*e* are provided at the middle and rear portions in the optical axis direction (front-back direction) of the outer circumference of the operation ring 13, respectively. The first engagement portion 4*d* is engaged with (fitted to) the first sliding portion 13*d* slidably in the circumferential direction, and the second engagement portion 4*e* is engaged with (fitted to) the second sliding portion 13*e* slidably in the same direction. Thereby, the lens unit 5 can be rotatably held by the holding member 4 steadily (without looseness).

The circuit board 18 is mounted with an image sensor 17, an unillustrated connector, an unillustrated electronic device, and the like. The circuit board 18 is fixed to a sensor metal plate 19 by an adhesive in a state where the position is adjusted so that the center of the light receiving surface of the image sensor 17 coincides with the optical axis OA of the lens unit 5. The sensor metal plate 19 is fixed to a receiving portion 4*h* provided in the board holder 4*f* of the holding member 4 by a screw 20. A cover 21 is fixed to the rear end portion of the board holder 4*f* to which the sensor metal plate 19 is fixed by an unillustrated screw. Thereby, the board holder 4*f* is sealed.

The camera module 1 thus configured generates a video signal by photoelectrically converting (capturing) an object image formed by the imaging optical system that includes the first to third lenses 7 to 9 in the lens unit 5 using the image sensor 17. In a case where the user rotates the operation ring 13, the lens unit 5 is moved in the optical axis direction relative to the holding member 4 according to the lead of the outer circumferential threaded portion 13*a* and the inner circumferential threaded portion 4*a* described above. Thereby, the user can adjust a distance in the optical axis direction between the lens unit (imaging optical system) 5 and the image sensor 17, i.e., optical adjustment such as focusing.

Figure 7:
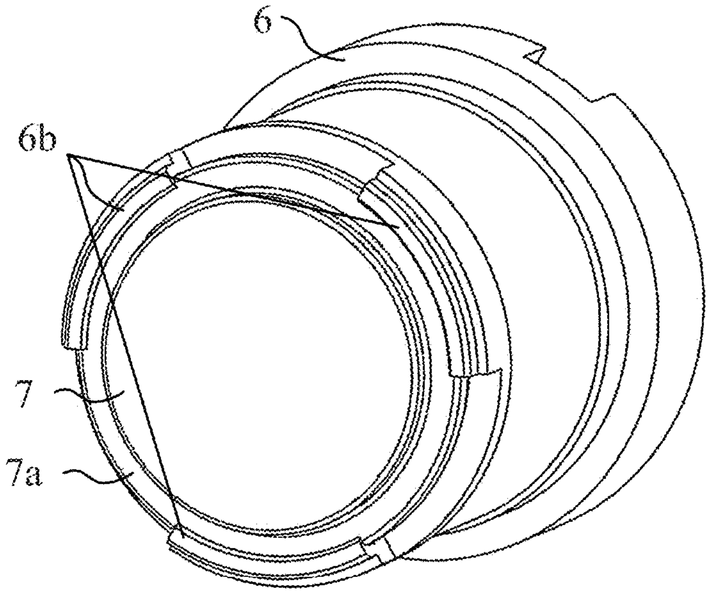
FIG. 7 is a perspective view illustrating an assembled state of a lens frame and first lens according to this embodiment.
Figure 8:
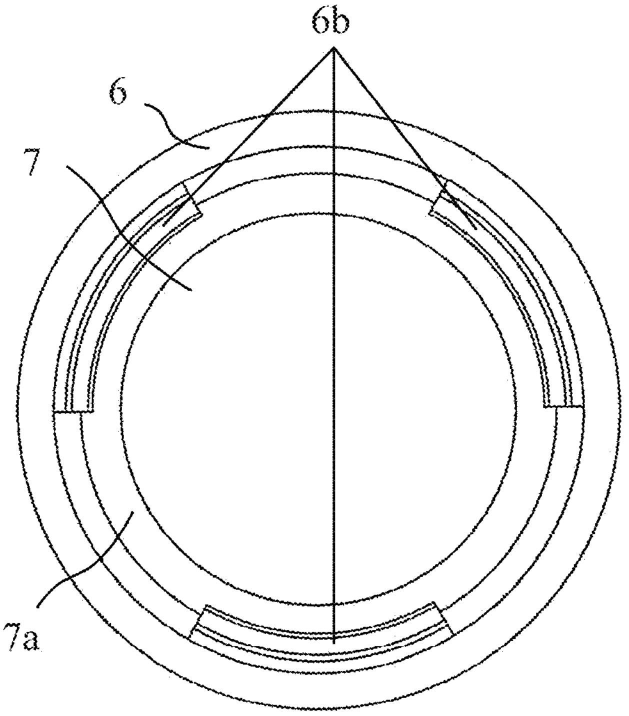
FIG. 8 is a front view illustrating the assembled state of the lens frame and first lens according to this embodiment.
Figure 9:
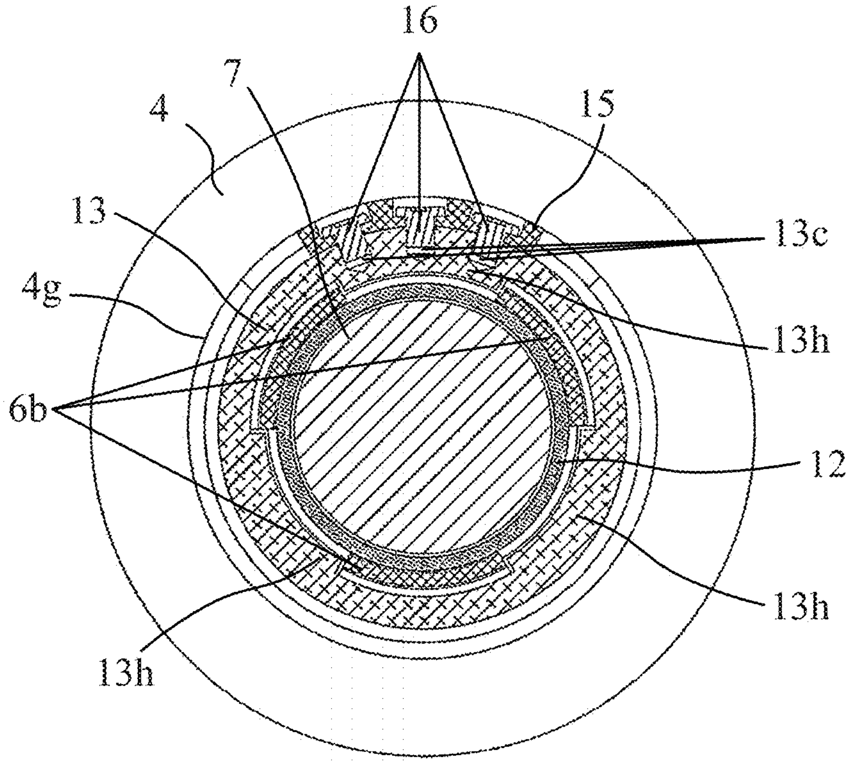
FIG. 9 is a sectional view of an area around the first lens according to this embodiment.

Referring now to FIGS. 3 to 5 and 7 to 9, a detailed description will be given of the configuration of the lens unit 5. FIGS. 7 and 8 illustrate the barrel frame 6 in which the first lens 7 is incorporated, viewed from the diagonal front side and the front side, respectively. FIG. 9 illustrates a section of a portion of the lens unit 5 near the first lens 7 taken by a plane orthogonal to the optical axis OA.

As illustrated in FIG. 4, an opening 6*a* is provided at the front end portion of the barrel frame 6. The first lens 7 is inserted into the barrel frame 6 from this opening 6*a*. The first lens 7 inserted into the barrel frame 6 is fixed to the barrel frame 6 by being caulked (crimped) by first caulking claws (first convex portions) 6*b* provided at a plurality of locations (three locations in this embodiment) at the front end portion of the barrel frame 6 spaced apart from each other in the circumferential direction, as illustrated in FIGS. 7 and 8. The barrel frame 6 is inserted into the operation ring 13 from an opening 13*f* formed at the rear end portion of the operation ring 13 as illustrated in FIG. 4, and fixed to the operation ring 13 by an adhesive.

At this time, as illustrated in FIG. 9, second convex portions 13*h* provided at three locations and spaced apart from each other in the circumferential direction on the inner circumference of the operation ring 13 are inserted into spaced between the three first caulking claws 6*b*. Three screw holes 13*c* into which the tips of three screws 16 are screwed to the rotation restricting member 15 described above are formed so as to extend radially inward from the outer circumferential surface of the operation ring 13 in the circumferential portion where one of the second convex portions 13*h* is provided. A circumferential portion of the circumferential wall portion of the operation ring 13, in which the second convex portion 13*h* is provided, has the same outer diameter as that of the other portion, but has a larger radial thickness (wall thickness) than that of the other portion. Therefore, the necessary depth of the screw hole 13*c* can be ensured without increasing the outer diameter of the operation ring 13. As a result, the size increase of the camera module 1 can be suppressed.

As illustrated in FIG. 9, the radial end (end in the radial direction) of the rotation restricting member 15 is located at approximately the same position in the radial direction as the outer circumferential surface of the barrel holder 4*g*. As a result, the size increase of the camera module 1 can be suppressed.

As illustrated in FIG. 3, a second elastic body 12, which serves as a second seal member that is an O-ring, contacts a concave portion 7*a* provided on the front end side of the outer circumference of the first lens 7. The second elastic body 12 is sandwiched between the concave portion 7*a* and a flange portion formed at the front end portion of the operation ring 13 so as to protrude toward the inner circumference side. A gap between the operation ring 13 and the first lens 7 is sealed by the second elastic body 12, and the intrusion of dust and water from the gap can be prevented.

As illustrated in FIG. 5, an opening 6*c* is provided at the rear end portion of the barrel frame 6. The second lens 8 is inserted into the barrel frame 6 from the opening 6*c*, and is fixed to the barrel frame 6 by being caulked by a second caulking claw 6*d* provided around the entire circumference in the middle in the optical axis direction (front-back direction) of the inner circumference of the barrel frame 6 as illustrated in FIG. 3. The second caulking claw 6*d* may be provided at a plurality of locations and spaced from each other in the circumferential direction.

The third lens 9 is inserted into the barrel frame 6 from the opening 6*c*. As illustrated in FIG. 3, a flat surface portion 9*a* is formed on the rear end side of the outer circumference of the third lens 9, and the flat surface portion 9*a* contacts a third elastic body 14, which is an O-ring. An inner circumferential thread portion 3*g* is formed at the rear end portion of the inner circumference of the operation ring 13, into which the outer circumferential thread portion of the press ring 11 as a pressing member is screwed, so that the third lens 9 is pressed against the contact surface of the inner circumference of the barrel frame 6 by the press ring 11 via the third elastic body 14. By screwing the press ring 11 into the barrel frame 6, a forward force is applied to the third lens 9. At this time, the third elastic body 14 sandwiched between the press ring 11 and the third lens 9 is elastically deformed, so that the pressing force from the press ring 11 is evenly transmitted to the third lens 9. The press ring 11 contacts a contact portion 6*e* of the barrel frame 6 so that the third lens 9 is not deformed by the pressing force from the press ring 11. Thereby, the barrel frame 6 can be fixed to the operation ring 13 while optical performance deterioration caused by the deformation of the third lens 9 is suppressed.

The press ring 11 screwed into the barrel frame 6 and the second sliding portion 13*e* of the operation ring 13 overlap each other in the radial direction. That is, the press ring 11 is disposed at a position where it radially overlaps a part of the second sliding portion 13*e* in the optical axis direction. This structure can increase a distance in the optical axis direction between the first sliding portion 13*d* and the second sliding portion 13*e*, and increase the engagement length between the lens unit 5 and the holding member 4. Thereby, the lens unit 5 can be suppressed from tilting relative to the holding member 4, and optical performance deterioration can be suppressed.

As described above, this embodiment can provide a camera module 1 having a reduced size and a configuration that restricts the rotatable range of the operation ring 13 relative to the barrel frame 6 by using the screws 16.

In this embodiment, the fixed member is a rotation restricting member 15, but the fixed member may be a member other than the rotation restricting member, for example a member that restricts movement of the lens unit 5 in the optical axis direction.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide a lens module that has a reduced size and can secure the depth of the screw hole formed in the operating member.

This application claims priority to Japanese Patent Application No. 2023-192689, which was filed on Nov. 13, 2023, and which is hereby incorporated by reference herein in its entirety.

What is claimed is:

1. A lens module comprising:

a lens unit that includes a barrel member that holds a lens, and an operating member fixed to an outer circumference of the barrel member;

a holding member that rotatably holds the lens unit; and a fixed member fixed to the operating member with a screw, wherein the barrel member includes first convex portions configured to fix the lens at a plurality of locations in a circumferential direction, wherein the operating member includes a second convex portion disposed between the first convex portions in the circumferential direction, and wherein a screw hole into which the screw is screwed is formed in a radial direction at a portion in the circumferential direction of the operating member, in which the second convex portion is provided.

2. The lens module according to claim 1, wherein a portion in the circumferential direction of the operating member, in which the second convex portion is provided has the same outer diameter as that of another portion of the operating member and a thickness in the radial direction larger than that of the other portion.

3. The lens module according to claim 1, wherein the fixed member is a rotation restricting member configured to restrict a rotatable range of the lens unit relative to the holding member.

4. The lens module according to claim 3, wherein the rotation restricting member includes a stopper portion that contacts the holding member at both ends of the rotatable range.

5. The lens module according to claim 1, further comprising a screw mechanism configured to move, in an optical axis direction relative to the holding member, the lens unit that is rotatable relative to the holding member.

6. The lens module according to claim 1, further comprising:

a first seal member disposed between the lens unit and the holding member, and a second seal member disposed between the operating member and the lens.

7. The lens module according to claim 1, wherein the barrel member holds another lens other than the lens, and wherein the barrel member includes:

a pressing member screwed into the barrel member and configured to press the other lens against the barrel member, and an elastic body disposed between the holding member and the other lens.

8. The lens module according to claim 7, wherein the lens unit includes a sliding portion on an outer circumference portion, wherein the holding member includes an engagement portion on an inner circumference portion, wherein the sliding portion is engaged with the engagement portion so that the sliding portion is slidable in the circumferential direction, and thereby the lens unit is held by the holding member, and wherein the holding member is disposed at a position at which the holding member overlaps, in the radial direction, a part of the sliding portion in an optical axis direction.

* * * * *